Sept. 15, 1942.    A. BERTEA    2,296,137
DYNAMO
Filed Dec. 17, 1940    3 Sheets-Sheet 1
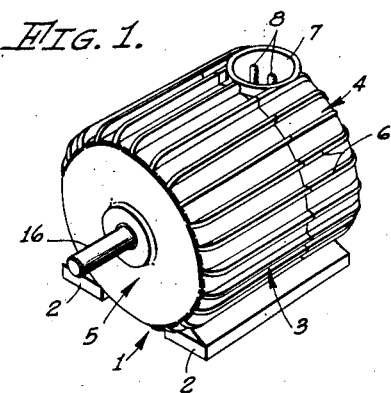
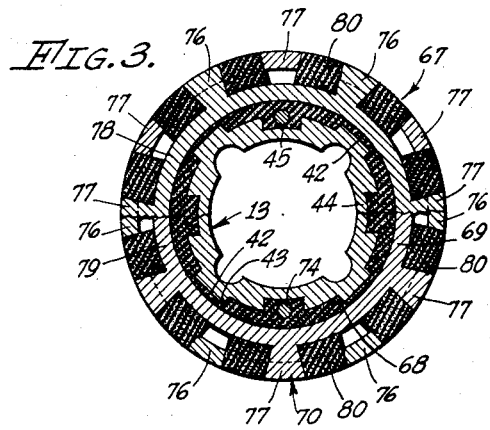
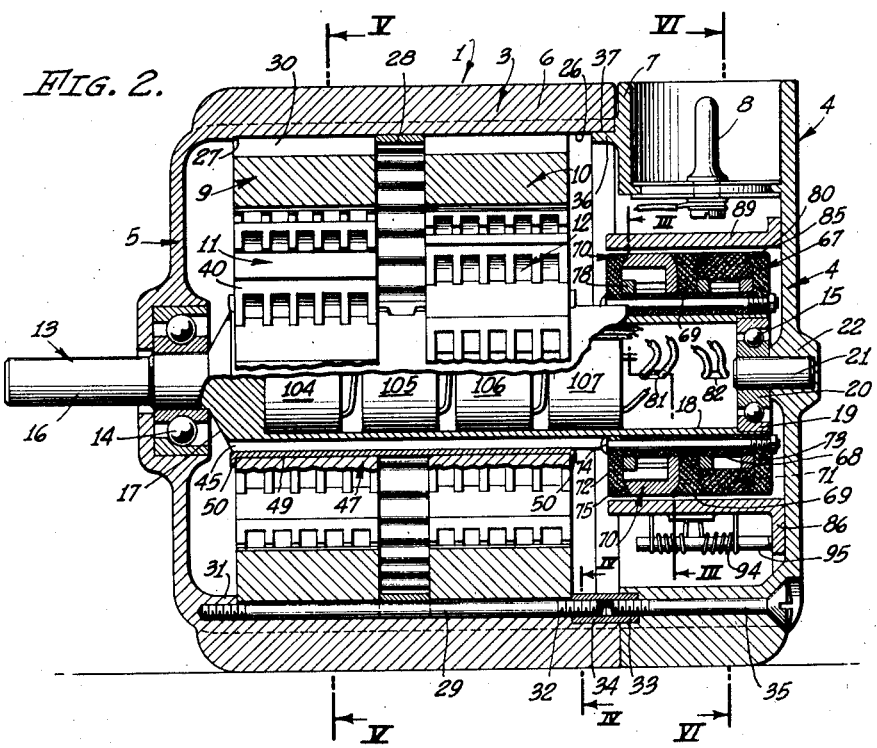
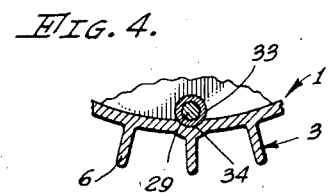
ALEX BERTEA
INVENTOR:
BY
ATTORNEY Sept. 15, 1942.　　　A. BERTEA　　　2,296,137
DYNAMO
Filed Dec. 17, 1940　　　3 Sheets-Sheet 2
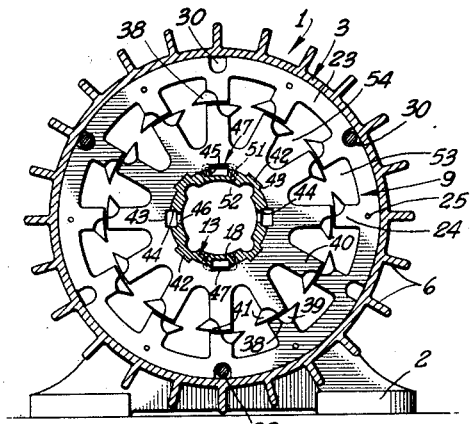
FIG. 5.
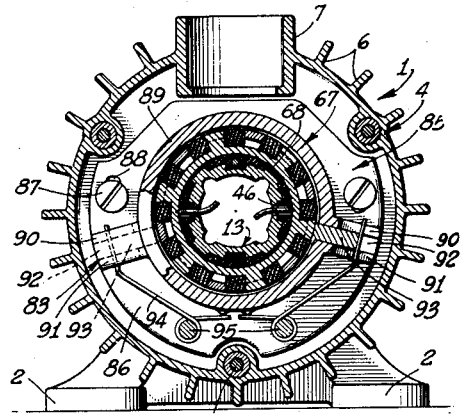
FIG. 6.
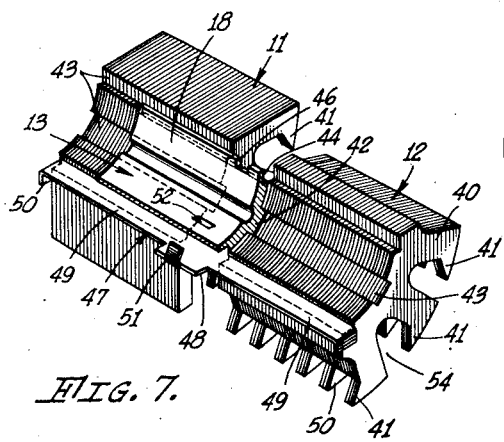
FIG. 7.
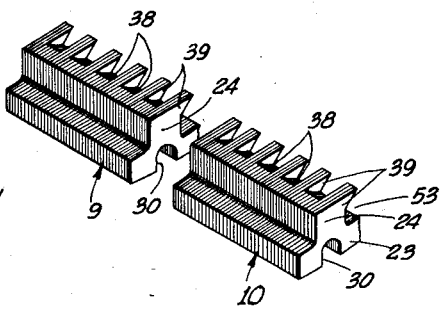
FIG. 8.
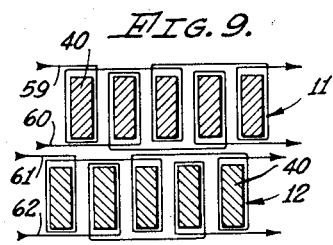
FIG. 9.
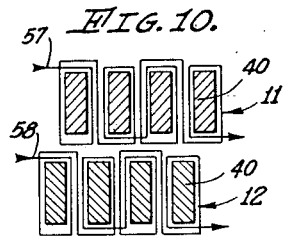
FIG. 10.
FIG. 11.
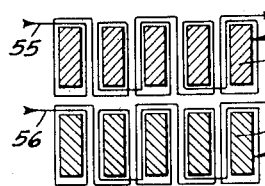
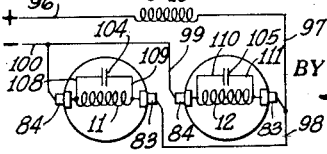
FIG. 14.
ALEX BERTEA
INVENTOR:
BY
ATTORNEY Sept. 15, 1942.  A. BERTEA  2,296,137
DYNAMO
Filed Dec. 17, 1940   3 Sheets-Sheet 3
FIG. 12.
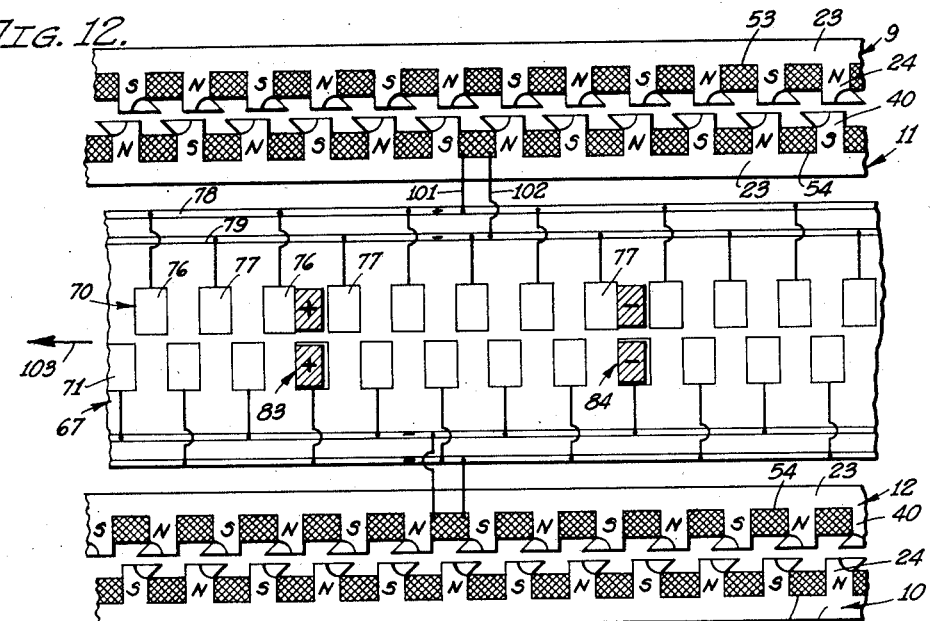
FIG. 13.
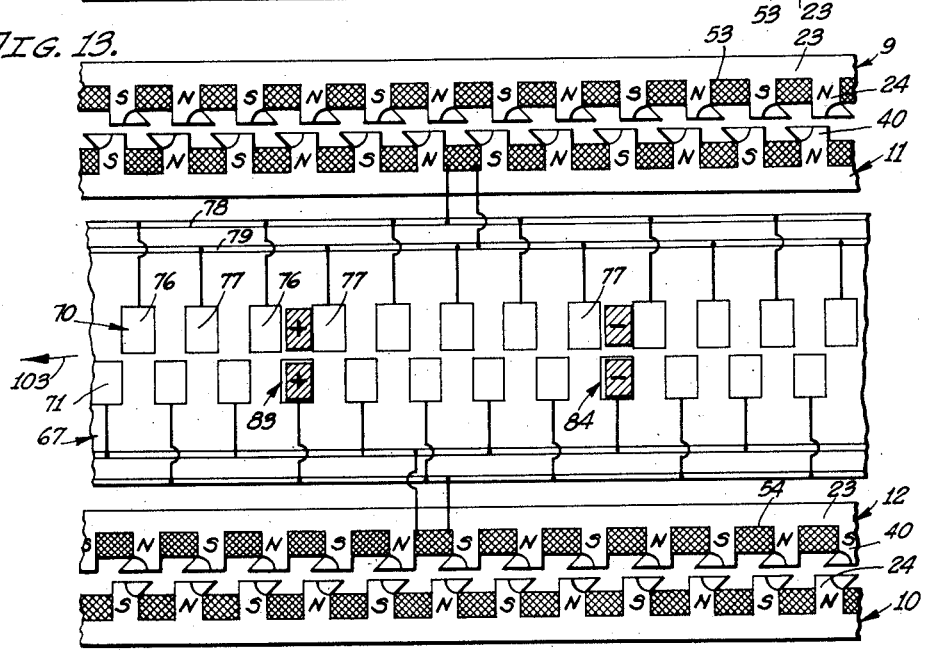
FIG. 15.       FIG. 16.
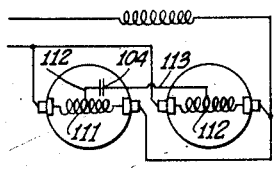 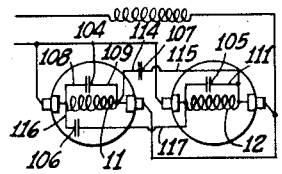
ALEX BERTEA
INVENTOR:
BY *Harold W. Mattingly*
ATTORNEY Patented Sept. 15, 1942

2,296,137

UNITED STATES PATENT OFFICE 2,296,137

DYNAMO

Alex Bertea, Los Angeles, Calif., assignor, by mesne assignments, to Bertea Products, Glendale, Calif., a copartnership composed of Alex Bertea and Ann Bertea Application December 17, 1940, Serial No. 370,449

20 Claims. (Cl. 171—252)

My invention relates to a dynamo and has particular reference to a small sized universal type of electric motor capable of operating at low speed and capable of developing a high torque.

Dynamos of the class to which this invention relates; namely, those employed as universal or commutating electric motors adapted for use with either direct or alternating current, are widely used today in the small sizes, notably those smaller than one-tenth horsepower for many purposes. Certain devices, such as gear or vane pumps, beaters or mixers, power drills and like mechanisms must be operated at relatively low speeds usually under one thousand R. P. M. and oftentimes as slowly as a few hundred R. P. M. The present small motors are unsuited for direct connection to such devices for the reason that they are incapable of developing full rated power output at such low speeds, the rated speeds of such motors normally ranging from three thousand to ten thousand R. P. M.

It is, therefore, the present practice to employ gear reducers in connection with small motors of this type in order to obtain the desired low rotational speed of the power take-off shaft. The use of small gear reducers introduces a number of disadvantages, not the least of which is the increased cost of the installation, the increase in cost of maintenance and the loss of efficiency. Small motors of this type usually have an overall efficiency of less than fifty percent and gear reducers suitable for use with such motors seldom have an efficiency exceeding fifty percent, with the result that the overall efficiency of the motor and gear reducer combination is usually less than twenty-five percent so that at least three-fourths of the power supplied to the motor is wasted.

This loss of efficiency is of great importance when such motors are installed in aircraft because of the relatively limited amount of power which is available for operating auxiliary devices of the character which would be powered by such small motors. Furthermore, the necessity for using gear reduction units adds to the size and weight of the equipment and the increased losses introduced by the gear reduction unit in turn requires that a larger size of motor be used than would otherwise be required, thus additionally increasing the size and weight of the installation. For this reason small motors of this character have not been widely used in aircraft manufacture since the conservation of space and weight is of utmost importance in aircraft construction.

It is, therefore, an object of my invention to provide a small dynamo operable as an electric motor of the universal type which overcomes the above noted disadvantages by developing full rated power output at speeds less than one thousand R. P. M.

It is also an object of my invention to provide a dynamo of the character set forth in the preceding paragraph in which the torque developed is substantially uniform at all rotational positions of the shaft.

It is an additional object of my invention to provide a motor of the character set forth hereinbefore which includes a dual field structure and an armature structure for each of the field structures and in which the structures are so arranged that one armature-field combination will develop maximum torque at the time the other is developing a minimum torque.

It is a further object of my invention to provide a motor of the character set forth in the preceding paragraphs which includes a commutating mechanism for reversing the direction of current flow in each of the armature structures at different times.

It is also an object of my invention to provide an electric motor of the character set forth hereinbefore which includes a novel magnet pole construction for the field and armature structures which cooperate to provide a substantially uniform torque over a wide range of relative pole positions.

It is a still further object of my invention to provide a dynamo of the character set forth in the preceding paragraphs which includes a novel means for preventing sparking and burning at the commutator.

It is additionally an object of my invention to provide a dynamo of the character set forth hereinbefore which is capable, when operated as a direct current generator, of developing full rated voltage and power output at speeds under one thousand R. P. M.

It is a still further object of my invention to provide a dynamo construction of the character set forth in the preceding paragraphs which includes novel features of construction permitting the attainment of high electric and mechanical efficiency and a high ratio of available power output to weight and which allows the dynamo to be readily manufactured at low cost.

Other objects and advantages of my invention will be apparent from a study of the following specifications, read in connection with the accompanying drawings, wherein:

Fig. 1 is a perspective view illustrating the construction and appearance of a preferred form of my invention;

Fig. 2 is a longitudinal sectional view of the dynamo illustrated in Fig. 1 with parts broken away to show the details of construction;

Fig. 3 is a cross sectional view taken substantially at the line III—III of Fig. 2 to illustrate the details of construction employed in the commutator portion of the dynamo;

Fig. 4 is a fragmentary sectional view taken substantially along the line IV—IV of Fig. 2 to illustrate the manner in which the assembly bolts serve also to secure the field structure of the machine against rotation within the housing;

Fig. 5 is a cross sectional view taken substantially along the line V—V of Fig. 2 illustrating the general form of the armature and field structures and the manner in which the armature structure is secured to the dynamo shaft;

Fig. 6 is a cross sectional view taken substantially along the line VI—VI illustrating additional details of construction of the commutator and showing the brush rigging and its mounting;

Fig. 7 is a fragmentary perspective view illustrating in detail the manner in which two separate armature structures are spaced relative to each other secured to the shaft of the dynamo;

Fig. 8 is a fragmentary perspective view illustrating the details of construction of the magnet pole pieces employed on both the field and armature structures;

Fig. 9 is a diagrammatic view illustrating one form of armature and field winding which may be employed;

Fig. 10 is a diagrammatic view similar to Fig. 9 but illustrating an alternative form of winding;

Fig. 11 is a diagrammatic view also similar to Fig. 9 but illustrating a still further modified form of armature winding;

Fig. 12 is a diagrammatic view representing the relative positions of the two armature sections, the associated field sections, the brushes, and the commutator at the time the circuit through one of the armature sections is being interrupted;

Fig. 13 is a view similar to Fig. 12 but illustrating the relative positions of the parts at the time the circuit is re-established in a direction reverse to that which is illustrated in Fig. 12;

Fig. 14 is a wiring diagram illustrating one manner of eliminating sparking and burning at the commutator;

Fig. 15 is a wiring diagram illustrating an alternative arrangement for eliminating sparking; and Fig. 16 is also a wiring diagram illustrating a still further manner of which sparking and burning of commutator may be eliminated.

Referring to the drawings, I have illustrated in Fig. 1 the preferred embodiment of my invention as including a housing 1 of generally cylindrical form which may be provided with feet 2 permitting attachment of the housing to a suitable supporting surface. The housing 1 preferably includes a main frame 3 and a removable end bell 4, the other end bell 5 being formed integrally with the main frame 3. The periphery of the housing 1 is preferably provided with a plurality of radially extending fins 6 to promote rapid dissipation of heat to the surrounding atmosphere. While not essential, this feature is considered desirable for the reason that the dynamo operates at relatively low speeds with the result that air circulation through the interior of the machine is materially less than is the case with present high speed types of small dynamos.

A portion 7 of the removable end bell 4 may be formed as a recess within which are disposed a pair of electrical terminals 8 permitting a cord end receptacle to be plugged in to establish the necessary electrical connection to the motor.

As is illustrated in Fig. 2, the main frame 3 is preferably tubular in form and encloses a pair of field structures 9 and 10 of generally circular form within which is disposed coacting armature structures 11 and 12. The armature is preferably supported by a shaft 13 journaled for rotation in the end bell 5 as by means of a ball bearing 14 and in the removable end bell 4 as by means of a ball bearing 15.

For purposes to be hereinafter described, the shaft 13 is preferably formed as indicated in Fig. 2 and includes an external power take-off portion 16 which is journaled by the bearing 14. Closely adjacent the interior side of the bearing 14 the shaft is shouldered as indicated at 17 to provide a shaft of relatively large diameter. This shaft portion is bored or otherwise formed with a longitudinally extending central recess 18 within the end of which is received the outer race 19 of the bearing 15, the inner race 20 thereof being supported upon a stub shaft 21 suitably affixed in a boss 22 formed on the end bell 4.

The field structures 9 and 10, as is indicated in Figs. 2 and 5, are preferably laminated in planes extending transversely of the shaft 13. Each of the field structures 9 and 10 may conveniently comprise a number of sheet metal stampings stacked one upon the other to the desired axial thickness, each stamping including a ring-like outer portion 23 having radially inwardly projecting field pole portions 24 formed integrally therewith. The laminations may be secured to each other as by means of a plurality of longitudinally extending rivets 25.

The interior of the main frame 3 is preferably bored out as indicated at 26 so as to provide a shoulder 27 against which the field structure 9 may rest, the outside diameters of the field structures 9 and 10 closely conforming to the diameter of the bored out portion 26.

The field structure 9 may be slipped into the interior of the main frame 3 as indicated in Fig. 2 and followed by a spacer member or ring 28 which is preferably generally circular in form but has portions displaced in a radial direction so as to provide a wavy contour. The second field structure 10 may then be slid into the bore 26 and into abutting relation with the spacer 28 and a plurality of tie bolts 29 may then be employed for clamping the field structures 9 and 10 and the spacer 28 against the shoulder 27.

The periphery of the field structures 9 and 10 are preferably notched as indicated at 30 in Fig. 5 in locations corresponding to the locations of the clamping bolts 29 so that these bolts may be passed between the field structures and the surface of the bore 26. The inwardmost end of each of the bolts 29 is preferably threadedly engaged with an internally threaded boss 31 provided at the proper locations on the end bell 5 and the outer end of these bolts may be threaded as indicated at 32 to receive a clamping nut 33.

The nut 33 is preferably tubular in form, being provided with an internally threaded bore and having an exterior diameter sufficient to engage the outermost face of the field structure 10 and so clamp the field structures within the main frame 3 as above described. The main frame 3 is preferably grooved as indicated at 34 in Fig. 4 at the locations of the nuts 33 so as to receive these nuts and prevent relative circumferential movement between the outermost end of the tie bolts 29 and the main frame 3. The nuts 33 may also be employed to threadedly engage the inner end of end bell securing screws 35 which are passed through suitable apertures provided in the removable end bell 4 and serve to secure the removable end bell to the main frame 3.

Proper axial alignment of the bearings 14 and 15 may be insured by providing on the end bell 4 a longitudinally extending flange portion 36 having an outer surface 37 concentric with the stub shaft 21 and defining a circle corresponding in diameter to the bored out portion 26 of the main frame 3 within which the flange 36 is received.

As is indicated in Fig. 2, the notches or channels 30 which are provided in the field structures 9 and 10 are so located on each of these field structures that the magnet poles 24 of one of the field structures is axially aligned with the corresponding poles of the other field structure.

Reference has been had hereinbefore to the forming of the field structures 9 and 10 by stacking a plurality of relatively thin laminations. The laminations employed for each of the field structures 9 and 10 are preferably of two forms, differing from each other only in the shape of the magnet pole portions 24. A part of the laminations employed carry field pole portions 24 which are cut away as on a curved line 33 (see Figs. 5 and 8), whereas, the other stampings employed include a pole portion 24 which defines a circumferentially extending tooth 39. These two types of laminations are stacked in alternate groups in the manner illustrated in Fig. 8 so that each of the magnet poles 24 include a plurality of circumferentially extending teeth 39, between adjacent ones of which the pole face is cut away as indicated by reference character 38 in Fig. 8. The field structures 9 and 10 are preferably so positioned within the main frame 3 as to extend the teeth 39 in a direction opposite to the direction of rotation of the armature 11—12.

The armature structures 11 and 12 are each also preferably formed of laminated material in such fashion as to provide a magnet pole portion 40 for each of the field pole portions 24, each of the armature poles 40 including circumferentially extending teeth 41 disposed in axial alignment with the teeth 39 formed on the associated field structure but extended in a direction opposite to the teeth 39; i. e., extended in the direction of rotation of the armature 11—12.

Each of the armature structures 11 and 12 are non-rotatably secured to the shaft 13 and are disposed thereon in such spaced relation to each other as to establish the desired alignment between the teeth 39 and 41. This may be accomplished by employing a shaft construction of the character illustrated in Fig. 2 and more clearly illustrated in Figs. 3 and 5. As is shown therein, the tubular portion 19 of the shaft 13 is preferably provided with a plurality of longitudinally extending ribs 42 adapted to be received within correspondingly shaped keyways 43 formed on the interior of the cylindrical surface defined by the armature structures 11 and 12.

Four of such keys 42 are employed in the form of the device illustrated in Fig. 5, whereas, the armature structures are provided with eight of the keyways 43, four of which are engaged by the keys or splines 42, two of which are disposed opposite longitudinally extending channels or grooves 44 formed in the exterior surface of the shaft portion 19, and two of which are disposed opposite similar longitudinally extending grooves 45 formed in the shaft portion 19.

The grooves 44 are preferably drilled at spaced points along their bottoms to provide a plurality of ports or apertures 46 so that electrical conductors may be carried from the interior of the shaft bore 19 through the apertures 46 and into a conduit space mutually defined by the grooves 44 and the keyways 43, along which conduit space the conductors may be extended to points disposed either between the armature structures 11 and 12 or at the outer surfaces of each of these structures.

Because of the relatively complex nature of the shaft 13, it is suggested that the same can be cheaply and economically formed by a die casting process.

The inter-engagement of the keys 42 with the keyways 43 serve to lock the armature structures 11 and 12 against rotation relative to each other and relative to the shaft 13. For reasons to be made apparent hereinafter, the keyways 43 are preferably so located as to cause the poles 40 of the armature 11 to be staggered relative to the poles of the armature 12. In the form shown, each armature structure comprises twelve of the poles 41 and the keyways 43 are so disposed that the poles 40 of the armature 11 are advanced $\frac{1}{24}$ of a revolution relative to the positioning of the poles 40 of the armature 12.

The armature structures 11 and 12 may also be held against longitudinal movement relative to each other and relative to the shaft 13 by employing a construction such as that illustrated in Figs. 5 and 7. For properly clamping and spacing the structures 11 and 12 from each other, use is made of a clamping strap 47 which includes a central rectangular portion 48 carrying oppositely extending arm portions 49. The arm portions 49 are preferably made with a width and thickness sufficient to permit them to be entirely received within one of the keyways 43, and the central portion 48 is made somewhat wider than the width of the keyways. Thus, the member 47 may be placed in the keyways 43 with the central portion 48 disposed between the two structures 11 and 12 and the ends of the arms 49 may be bent down and clamped against the outer faces of the armature structures in the manner illustrated in Fig. 7 at 50 to clamp these structures against the central portion 48.

The central portion 48 preferably also includes a pair of upstanding ears 51 adapted to be received in suitably positioned apertures 52 formed in the shaft 13 on opposite sides of the channels 45. The ears 51 serve to lock the entire assembly against axial movement relative to the shaft 13, and the member 47 serves to hold the armature structures 11 and 12 in their proper spaced relation relative to each other.

The dynamo is preferably provided with two sets of field windings, one for each of the field structures 9 and 10 and two sets of armature windings, one for each of the armature structures 11 and 12. These windings are each preferably so arranged that when an electric current is passed therethrough, the polarity of the magnetism induced in each pole piece will be opposite to the polarity induced in adjacent pole pieces.

This may be accomplished by employing a winding of the character illustrated diagrammatically in Fig. 9. It will be noted that each of the pole pieces 24 of the field structures 9 and 10 define a longitudinally extending channel or recess 53 within which electrical conductors may be disposed and that a similar conductor receiving space 54 is defined by the pole pieces 40 of the armature structures.

In the form of winding illustrated in Fig. 9, a conductor 55 is wound one or more times around one of the pole pieces 24 in a clockwise direction, the conductors being disposed in the spaces 53. The conductor 55 may then be carried past the next adjacent pole piece and wound thereabout in a counter-clockwise direction for a corresponding number of turns after which the conductor is wound in a clockwise direction around the next adjacent pole piece and so on until field coils are established encircling each and every one of the pole pieces 24. A conductor 56 may be similarly wound about the pole pieces 24 of the other of the field structures and these two field windings may be either connected in series or parallel as desired.

Fig. 10 illustrates armature conductors 57 and 58 as being wound in a similar fashion about the pole pieces 40 of the armature structures 11 and 12.

An alternative form of winding which may be employed on either the field or armature is also illustrated in Fig. 9 wherein an armature conductor 59 is illustrated as being wound one or more times in a clockwise direction about alternate ones of the pole pieces 40 of the armature structure 11, a separate conductor 60 being wound in a counter-clockwise direction about those ones of the pole pieces 40 which are not surrounded by the conductor 59. Conductors 61 and 62 may be wound in a similar fashion about the pole pieces 40 of the armature structure 12, it being understood that the two sets of windings on each of the armature structures may be connected either in series or parallel with each other.

For convenience in winding, the armature coils of the character illustrated in Fig. 11 may be employed. As is illustrated therein, a plurality of armature conductors 63, 64, etc., are each passed zig-zag fashion through the armature winding spaces 54; that is to say, each of the conductors 63, 64 is passed from front to rear, for example, through one of the spaces 54 between adjacent pole pieces 40 and then passed from rear to front through the next adjacent space 54 and so on until the conductors 63, 64, etc., are passed through each of the winding spaces 54. A similar group of conductors 65, 66, etc., may be wound in a similar fashion on the other armature structure. Each of the groups of conductors 63, 64, etc., and 65, 66, etc., may either be connected in series or in parallel with each other, as desired.

Irrespective of the form of armature and field winding employed, it is preferred that the field coils for both of the field structures 9 and 10 be so interconnected as to provide a single pair of field leads so that the application of a suitable potential between these leads will energize both of the fields 9 and 10. The armatures are, however, preferably maintained electrically separate from each other so that there is provided a pair of armature leads for the armature structure 11 and another pair of leads for the armature structure 12 so as to permit these two armature structures to be independently energized and controlled.

It will be noted that the dynamo of my invention differs radically from conventional constructions in this respect, since conventional constructions ordinarily require at least one armature lead for each of the armature coils, such leads ordinarily being connected to individual commutator bars, whereas, with the construction above described each of the armature structures 11 and 12 provides only a single pair of supply leads.

Electrical current supplied to the dynamo of my invention may be conveyed to the armature leads by employing a commutator of special form and construction. This commutator is indicated generally in Figs. 2, 3 and 6 by the reference character 67. This commutator structure preferably includes a cylindrical supporting sleeve 68 formed of insulating material and suitably contoured on its interior surface so as to be drivably engaged by the keys 42 formed on the shaft 13.

The sleeve 68 is surrounded by a central spacer member 69 also formed of insulating material on opposite sides of which are placed commutator bar assemblies 70 and 71, these assemblies being clamped against the spacer 69 as by means of inner and outer end rings 72 and 73 inter-engaged with each other as by means of clamping bolts 74 passed through suitable holes provided in the clamping rings 72 and 73 and also through the wall of the insulating sleeve 68.

The inner faces of both of the end rings 72 and 73 and both faces of the spacer ring 69 are preferably chamfered or beveled as indicated by reference character 75 in Fig. 2 and each of the commutator bar assemblies 70 and 71 are similarly chamfered so that tightening of the clamping screws 74 will serve to not only clamp the commutator bar assemblies 70 and 71 between the end rings 72 and 73 and the central spacer 69, but will also serve to urge the assemblies 70 and 71 inwardly against the periphery of the insulating sleeve 68 so as to secure the assemblies 70 and 71 against radial outward movement.

The commutator bar assemblies 70 and 71 are identical and each is preferably constructed along the lines illustrated in Fig. 3. As is disclosed therein, the bar assembly 70 comprises two sets of commutator bars, the bars 76 of one set being disposed alternately about the circumference of the commutator 67 with bars 77 of the other set. Each of the bars 76 of one set is preferably electrically connected at its innermost end (left hand end as viewed in Fig. 2) with an interconnecting electrical conductor which may conveniently comprise a ring 78 encircling the insulating sleeve 68. In a similar fashion each of the bars 77 of the other set is electrically connected to an interconnecting ring 79 disposed adjacent the outward end (the right hand end as viewed in Fig. 2) of the bars 77, the ring 78 also surrounding and resting upon the insulating sleeve 68.

The sides of each of the bars 76 and 77 are preferably disposed substantially radially relative to the center of the shaft 13 and insulating spacer blocks 80 are placed between adjacent ones of the bars 76 and 77. With this construction the tightening of the clamping bolts 74 serves to clamp each of the bars 76 and 77 and each of the insulators 80 between the end rings 72, 73 and the central spacer 69 and against the outside of the insulating sleeve 68.

The connector rings 78 and 79 which interconnect all of the bars of each set of commutator bars are each connected to one of the armature leads of the armature structure 11, for example. These leads may be carried into the hollow interior 18 of the shaft 13 through the wiring apertures 46 previously described and thence along the interior of the shaft 13 to the right as viewed in Fig. 2. The extension of these conductors into electrical connection with the connector rings 78 and 79 may be permitted by providing suitable apertures 81 in the shaft 13 and extending through the insulating sleeve 68, these apertures being disposed in a longitudinal position lying between the connector rings 78 and 79, such disposition being clearly shown in Figs. 2 and 6.

The other commutator bar assembly 71 is similarly connected, for example, to the leads of the armature structure 12, apertures 82 being provided for extending the armature leads through the shaft and the insulating sleeve 68 and into connection with the connector rings 78 and 79 of the assembly 71.

For reasons to be made apparent hereinafter, the commutator bar assembly 71 is preferably shifted circumferentially relative to the assembly 70 in the same manner as the armature structure 12 is shifted circumferentially relative to the armature structure 11. This relative disposition of the assemblies 70 and 71 disposes each of the bars of one of the assemblies in a circumferential position lying centrally between adjacent pairs of the other assembly.

Electrical current is preferably supplied to each of the commutator bar assemblies 70 and 71 by means of two sets of brushes 83 and 84 which are mounted in a substantially conventional manner by means of a brush rigging 85. The rigging 85 may comprise an annular ring-like supporting plate 86 secured to the interior surface of the end bell 4 as by means of screws 87, the screws 87 being passed through elongated apertures 88 in the plate 86, whereby a small amount of adjustment of the rotational position of the plate 86 may be effected. The plate 86 supports a longitudinally extending cylindrical flange 89 which lies closely adjacent to the surface of the commutator 67 and serves to protect the same from dust, dirt and like foreign matter.

The sleeve portion 89 is provided at two points spaced from each other about the periphery of the sleeve with a pair of radially extending flanges 90 and 91 which are each spaced from each other to define a brush receiving channel 92, a pair of rectangular brushes 93 being slidably received in each of the channels 92 so that one pair of the brushes 93 comprises the set 83, whereas, the second pair of brushes 93 comprises the set 84.

It will be understood that one of the brushes of each of the sets 83 and 84 engages the commutator bar assembly 70, whereas, the other of the brushes of each of the sets 83 and 84 engages the other of the commutator bar assemblies 71. The brushes 93 may be individually spring urged into engagement with the commutator 67 as by means of springs 94 suitably supported by means of laterally extending studs 95 carried by the plate portion 86 of the brush rigging.

The manner in which the above described instrumentalities are electrically interconnected with each other and the manner in which they cooperate to produce the results achieved by my invention may best be understood by having reference to Figs. 12, 13 and 14. Referring first to Fig. 14, it will be observed that one supply conductor 96 is connected (preferably through the receptacle construction 7—8) to one of the leads of the field winding 9—10, the other of such field leads being connected as by means of a conductor 97 to the brushes comprising the set 83, the individual brushes of such set being interconnected as by means of a conductor 98. The individual brushes of the set 84 are also preferably interconnected as by means of a conductor 99 which is in turn connected to the other supply line 100. This arrangement corresponds to the series connection employed with conventional dynamo constructions since the field 9—10 is connected in a series circuit with the armatures 11 and 12. Alternatively, the field 9—10 could be connected in parallel with the armatures in case a shunt type of connection were considered desirable.

Referring now to Fig. 12, it is explained that this figure is a diagrammatic respresentation of the field and armature structures and the commutator structure 67. The bar identified by reference character 78 represents the connection ring which interconnects the commutator segments 76, while the bar 79 is intended to represent the other connection ring previously identified by that reference character and employed to interconnect the segments 77. The armature leads of the armature structures 11 are identified by reference characters 101 and 102, these conductors being connected respectively to the connector rings 78 and 79.

Attention is directed to the fact that the circumferential width of each of the brushes 93 is made less than the circumferential width of the insulators 80 which are disposed between adjacent bars so that as the commutator is moved in a direction represented by arrow 103 in Fig. 12, the electrical contact between the brushes and the bars 76 is interrupted prior to the engagement of the brushes with the bars 77. It will be noted by reference to Fig. 12 that at the time one of the bars 76 of the brush assembly 70 is engaged by a brush of the brush set 83, an alternate commutator bar 77 of the set 70 is engaged with one of the brushes 84.

Assuming for example that the line conductor 96 referred to in Fig. 14 is of positive polarity and the line conductor 100 is of negative polarity, then, as is indicated in Fig. 12, the brushes of the set 83 will be connected to the positive side of the supply line, whereas, the brushes of the set 84 will be connected with the negative side of the line. With the parts in the relative positions shown in Fig. 12, this serves to pass current through the windings of the armature 11 in such direction as to form alternate north and south magnetic poles as indicated in Fig. 12 which are at this time disposed substantially opposite adjacent field poles 24 on opposite magnetic polarity.

Fig. 12 represents the armature structure 11 and the field structure 9 as being disposed in a relative position which I shall term the neutral point; i. e.; a point at which the magnetic attraction between the armature and field poles has no circumferential or torque-producing component and therefore does not tend to produce rotation of the armature. It is at this point or just prior thereto that I prefer to de-energize the armature winding and I, therefore, so arrange the positioning of the brush sets 83 and 84 as to cause the brushes to become disengaged from their respective commutator bars when this condition obtains.

It will be observed that due to the staggered position of the bars forming the commutator bar assembly 70 relative to the bars of the bar assembly 71, current will, however, at this time be supplied to the windings of the armature structure 12, the pole pieces 40 of which are disposed in such position relative to the pole pieces 24 of the field structure 10 as to provide a circumferential component of the attractive force tending to move the armature in the direction of the arrow 103. This is by virtue of the fact that the angular position of the pole pieces 40 of the armature structure 12 are staggered relative to the angular positions of the pole pieces of the armature structure 11, whereas, the pole pieces of the field structures 9 and 10 are in the same angular positions. Thus, when the parts are in the positions illustrated in Fig. 12, a torque will be exerted by the magnetic attraction between the armature structure 12 and the field structure 10 at the time the windings of the armature structure 11 are disconnected.

Upon a slight rotation of the armature of the dynamo, the parts will arrive at a position such as that illustrated in Fig. 13 wherein the brushes which are engaged with the commutator bar assembly 70 are re-connected to the bars 77 and 76 thereof in such manner as to pass current through the windings of the armature structure 11 in a direction opposite to that occurring under the conditions illustrated in Fig. 12. When this condition obtains, the substantially oppositely disposed poles of the armature 11 and the field 9 will have induced in them like magnetic polarities as is indicated in Fig. 13. This provides a repulsive force between these magnetic poles tending to move the armature in the direction of the arrow 103 and further provides an attractive force between each of the armature poles and the next forwardly disposed field pole. Thus, when the parts are disposed in the positions illustrated in Fig. 13, both of the armature structures 11 and 12 provide a torque tending to rotate the armature in the direction indicated by the arrow 103. This combined torque persists until the armature structure 12 is moved to a position relative to the field structure 10 corresponding to that illustrated in Fig. 12 as occupied by the armature structure 11 relative to the field structure 9, at which time the direction of current passage through the coils of the armature 12 will be reversed so as to provide for additional production of torque by the armature structure 12.

Attention is at this point particularly directed to the shape of the field poles 24 and 40. It is well understood that in electrical motor design where pole faces of substantially rectangular form are employed, the torque component developed by the attractive force exerted between an armature pole and a field pole of opposite magnetic polarities first appears at a relatively low value when the pole pieces are separated by a considerable distance and that the torque component rapidly increases to a maximum as the poles are moved toward alignment with each other and then reduces to zero at the time the poles are moved into aligned positions.

By employing pole pieces of the character described herein and characterized by the use of the circumferentially extending teeth 39 and 41, this non-uniformity of the torque characteristic is avoided. The teeth 39 and 41 of the field and armature pole pieces extend toward each other so that the attractive force tending to produce a rotation of the armature comes into being at a time when the pole pieces are more widely separated than is the case with conventional constructions. Furthermore, by virtue of the relative close positioning of the teeth at a time when the actual pole pieces are considerably misaligned the torque component reaches a maximum value long before the pole pieces are moved into alignment. The shape of the teeth and their spacing from each other longitudinally of the length of the pole piece provides for maintaining this maximum torque condition over a relatively wide range of armature pole piece positions relative to the field pole and the subsequently occurring proximity of the main portion of the pole pieces serves to maintain a high value of torque component at a time when the torque component would be rapidly reducing in value with conventional constructions.

From the previous description relative to Figs. 12 and 13 it will be noted that the circuit through each of the armature windings is interrupted and then re-established in a reverse direction many times during one revolution of the armature. Since the armature windings are highly inductive, it is necessary that some provision be made for eliminating the sparking at the commutator at the time the circuit through the armature coils is interrupted. For this purpose I prefer to employ condensive reactances 104, 105, 106 and 107. These may conveniently comprise condensers of conventional construction encased within a tubular case and may be made of such size as to permit them to be readily received within the interior 18 of the dynamo shaft 13. These condensers are preferably connected to the armature windings in a manner to be hereinafter described and these connections may be readily made within the interior of the armature shaft.

Fig. 14 illustrates one of the ways in which the condensers may be employed, the scheme which is illustrated in this figure employing only two of the condensers. In this form of my invention, the condenser 104 is connected by means of conductors 108 and 109 to the leads of the armature 11 and the condenser 105 is connected by means of conductors 110 and 111 to the leads of the armature 12. Thus, when the circuit through either of the armature windings 11 or 12 is interrupted, the resulting collapse of the magnetic field therein and the counter-voltage inducted thereby is absorbed and used to charge the condenser 104 or 105 which is connected across the armature windings. The condenser thus operates in a well known manner to eliminate the sparking at the commutator resulting from the inductive "kick" of the armature coils at the time the circuit therethrough is interrupted.

A further novel result follows, however, from the use of the condensers in the manner above described. The collapse of the magnetic field in the armature is caused to occur at a slower rate than if the condensers were not used, thus retaining a certain amount of magnetic attraction between the pole pieces during the time the armature is entirely disconnected. Furthermore, the polarity of the charge which is thus induced in the condensers is of such nature as to assist in overcoming the inductive reactance of the armature windings at the time they are re-connected for an opposite direction of current flow. This results in a more rapid build up of the armature flux in an opposite direction, with the result that the maximum available torque component is developed in a shorter time than if the condensers were not employed.

I have illustrated in Fig. 15 an alternative arrangement employing only the condenser 104 in which case the condenser is connected as by means of conductors 112 and 113 across the midpoints of the windings of the armatures 11 and 12. This arrangement utilizes one of the armature windings as a stabilizer to prevent building up of excessive inductive voltages in the other of the windings at the time such other winding is disconnected.

I have illustrated in Fig. 16 a form of connection of the condensers which combines the advantageous features of both of the schemes of connection previously described. In this form of my invention the condenser 104 is connected as previously described in connection with Fig. 14 as by means of conductors 108 and 109 across the leads of the windings of the armature 11 and the condenser 105 is connected by means of the conductors 110 and 111 across the leads of the armature 12. Additionally, the condenser 106 is connected by means of conductors 114 and 115 between corresponding armature leads of both armatures and the condenser 107 is similarly connected by means of conductors 116 and 117 between the other corresponding leads of the two armature windings.

From the foregoing it will be observed that I have provided a dynamo construction of such character that a multi-pole machine may be made in very small sizes and that by virtue of the multi-pole arrangement and also by virtue of the staggered armature and commutator relationships, the machine is capable of developing a high output torque at relatively low rotational speeds. I have found that a machine constructed substantially as above described will develop full rated power output at a rotational speed of less than one thousand R. P. M. and in many cases at a speed of two or three hundred R. P. M. I have further found that a dynamo of this character has an overall electrical and mechanical efficiency in excess of fifty percent.

It is, therefore, apparent that the dynamo of my invention may be used as a motor for direct connection to slow speed equipment, such as pumps and the like, without requiring the interposition of gear reduction units as is the case with the present types of small electric motors. For this reason the motor of my invention is particularly adaptable for use in aircraft installations for the reason that a much smaller, lighter weight and more efficiently operating piece of equipment may be used than is possible with the present types of small motors.

Attention is also directed to the various above novel features of construction which permit the dynamo of my invention to be readily and economically manufactured at low cost.

While I have shown and described the preferred embodiment of my invention, I do not desire to be limited to any of the details of construction shown or described herein, except as defined in the appended claims.

I claim:

1. In a dynamo, the combination of: a stationary field comprising a plurality of axially extending field pole pieces disposed in uniform circumferential spaced relation to each other; and an armature supported for rotation in said field comprising a plurality of sets of armature pole pieces, each of said sets including the same number of armature pole pieces as there are field pole pieces in said field, the pole pieces of each of said sets being disposed in uniform circumferential spaced relation to each other and in circumferentially offset relation to the pole pieces of adjacent sets.

2. In a dynamo, the combination of: a stationary field comprising a plurality of adjacently disposed field structures each of which includes a plurality of field pole pieces disposed in uniform circumferential spaced relation to each other, the pole pieces of each structure being axially aligned with the pole pieces of an adjacent structure; and an armature supported for rotation in said field comprising an armature unit for each of said field structures, each of said units including a number of armature pole pieces equal to the number of pole pieces included in each of said field structures, the armature pole pieces of each of said units being disposed in uniform circumferential spaced relation to each other and in circumferentially offset relation to the pole pieces of adjacent units.

3. In a dynamo, the combination of: a stationary field comprising a pair of adjacently disposed field structures each of which includes a plurality of field pole pieces disposed in uniform circumferential spaced relation to each other, the field pole pieces of one of said structures being axially aligned with the field pole pieces of the other of said structures; and an armature supported for rotation in said field comprising a pair of armature units, each of said units including a number of armature pole pieces equal to the number of field pole pieces in each of said field structures, the armature pole pieces of each of said units being disposed in uniform circumferential spaced relation to each other, and the pole pieces of one of said units being circumferentially displaced relative to the pole pieces of the other of said units by an amount substantially equal to one-half the angular distance between adjacent pole pieces.

4. In a dynamo, the combination of: a stationary field comprising a plurality of axially extending field pole pieces disposed in uniform circumferential spaced relation to each other; an armature supported for rotation in said field comprising a plurality of sets of armature pole pieces, each of said sets including the same number of armature pole pieces as there are field pole pieces in said field, the pole pieces of each of said sets being disposed in uniform circumferential spaced relation to each other and in circumferentially offset relation to the pole pieces of adjacent sets; a single circuit winding for said field connected to a source of electric power and so arranged as to induce a magnetic polarity in each of said field poles opposite to the polarity induced in adjacent field poles; a single circuit armature winding for each of said sets of armature field poles, said armature windings being so arranged as to induce in each armature pole a magnetic polarity opposite to that induced in circumferentially adjacent armature poles upon the passage of an electric current through each of said armature windings; and commutating means supported for rotation with said armature and connected between each of said armature windings and a source of electric power, said commutating means being so arranged as to reverse the direction of flow of current through each of said armature windings upon each rotational movement of said armature through an angle equal to the angular spacing of said pole pieces.

5. In a dynamo, the combination of: a stationary field comprising a pair of field structures each of which includes an even number of field pole pieces disposed in uniform circumferential spaced relation to each other with the pole pieces of one of said structures disposed in axial alignment with the pole pieces of the other of said structures; an armature supported for rotation in said field comprising a pair of armature units each including said even number of armature pole pieces disposed in uniform circumferential spaced relation to each other with the armature pole pieces of one of said units circumferentially staggered relative to the armature pole pieces of the other of said units; a single circuit winding for said field connected to a source of electric power and so arranged as to induce a magnetic polarity in each of said poles opposite to the polarity induced in circumferentially adjacent field poles; a single circuit armature winding for each of said armature units, said armature windings being so arranged as to induce in each armature pole a magnetic polarity opposite to that induced in circumferentially adjacent armature poles upon the passage of an electric current through said armature windings; commutating means supported for rotation with said armature and connected between each of said armature windings and a source of electric power, said commutating means including a pair of sets of commutator segments each identified with one of said armature units, there being the same number of segments in each of said sets as there are armature pole pieces in each of said units, alternately disposed ones of said segments being interconnected as a group and each of said groups being electrically connected to each end of said single armature circuit identified therewith; and a pair of brushes for each of said sets of segments for conducting an electric current thereto, the brushes of each pair being circumferentially spaced from each other a distance such that one of said brushes engages a segment identified with one group when the other brush engages a segment identified with the other group.

6. In a dynamo, the combination of: a stationary field comprising an even number of field pole pieces disposed in uniform circumferential spaced relation to each other; an armature supported for rotation in said field comprising said even number of armature pole pieces also disposed in uniform circumferential spaced relation to each other; a single field circuit connected to a source of electric power and so arranged as to induce in each of said field pole pieces a magnetic polarity opposite to that induced in adjacent field pole pieces; a single armature circuit so arranged as to simultaneously induce in each of said armature pole pieces a magnetic polarity opposite to that induced in adjacent ones of said armature pole pieces when an electric current is passed through said armature circuit; and commutating means carried by said armature and connected between said armature circuit and a source of electric power for reversing the direction of current flow through said armature circuit for each passage of an armature pole piece past a field pole piece.

7. In a dynamo, the combination of: a stationary field comprising an even number of field pole pieces disposed in uniform circumferential spaced relation to each other; an armature supported for rotation in said field comprising an even number of armature pole pieces also disposed in uniform circumferential spaced relation to each other; a single field circuit connected to a source of electric power and so arranged as to induce in each of said field pole pieces a magnetic polarity opposite to that induced in adjacent field pole pieces; a single armature circuit so arranged as to simultaneously induce in each of said armature pole pieces a magnetic polarity opposite to that induced in adjacent ones of said armature pole pieces when an electric current is passed through said circuit; and commutating means carried by said armature and connected between said armature circuit and a source of electric power for first disconnecting said armature circuit from said source of power and then re-connecting said armature circuit for a reverse direction of current flow therethrough for each passage of an armature pole piece past a field pole piece.

8. In a dynamo, the combination of: a stationary field comprising an even number of field pole pieces disposed in uniform circumferential spaced relation to each other; an armature supported for rotation in said field comprising an even number of armature pole pieces also disposed in uniform circumferential spaced relation to each other; a single field circuit connected to a source of electric power and so arranged as to induce in each of said field pole pieces a magnetic polarity opposite to that induced in adjacent field pole pieces; a single armature circuit so arranged as to simultaneously induce in each of said armature pole pieces a magnetic polarity opposite to that induced in adjacent ones of said armature pole pieces when an electric current is passed through said circuit; commutating means carried by said armature and connected between said armature circuit and a source of electric power for first disconnecting said armature circuit from said source of power and then re-connecting said armature circuit for a reverse direction of current flow therethrough for each passage of an armature pole piece past a field pole piece; and condenser means connected across said armature circuit for absorbing the surge produced by the disconnection of said armature circuit.

9. In a dynamo, the combination of: a stationary field comprising a pair of field structures each of which includes an even number of field pole pieces disposed in uniform circumferential spaced relation to each other with the pole pieces of one of said structures disposed in axial alignment with the pole pieces of the other of said structures; an armature supported for rotation in said field comprising a pair of armature units each including said even number of armature pole pieces disposed in uniform circumferential spaced relation to each other with the armature pole pieces of one of said units circumferentially staggered relative to the armature pole pieces of the other of said units; a single circuit winding for said field connected to a source of electric power and so arranged as to induce a magnetic polarity in each of said poles opposite to the polarity induced in circumferentially adjacent field poles; a single circuit armature winding for each of said armature units, said armature windings being so arranged as to induce in each armature pole a magnetic polarity opposite to that induced in circumferentially adjacent armature poles upon the passage of an electric current through said armature windings; commutating means carried by said armature and connected between each of said armature windings and a source of electric power for first disconnecting said armature windings from said source of power and then reconnecting said windings for a reverse direction of current flow therethrough upon the movement of the armature poles associated with said armature winding past each of said field pole pieces of the corresponding field structure; and condenser means connected in parallel with each of said armature windings.

10. In a dynamo, the combination of: a stationary field comprising a pair of field structures each of which includes an even number of field pole pieces disposed in uniform circumferential spaced relation to each other with the pole pieces of one of said structures disposed in axial alignment with the pole pieces of the other of said structures; an armature supported for rotation in said field comprising a pair of armature units each including said even number of armature pole pieces disposed in uniform circumferential spaced relation to each other with the armature pole pieces of one of said units circumferentially staggered relative to the armature pole pieces of the other of said units; a single circuit winding for said field connected to a source of electric power and so arranged as to induce a magnetic polarity in each of said poles opposite to the polarity induced in circumferentially adjacent field poles; a single circuit armature winding for each of said armature units, said armature windings being so arranged as to induce in each armature pole a magnetic polarity opposite to that induced in circumferentially adjacent armature poles upon the passage of an electric current through said armature windings; commutating means carried by said armature and connected between each of said armature windings and a source of electric power for first disconnecting said armature windings from said source of power and then re-connecting said windings for a reverse direction of current flow therethrough upon the movement of the armature poles associated with said armature winding past each of said field pole pieces of the corresponding field structure; and a condenser means connected between the midpoints of each of said armature windings.

11. In a dynamo, the combination of: a stationary field comprising a pair of field structures each of which includes an even number of field pole pieces disposed in uniform circumferential spaced relation to each other with the pole pieces of one of said structures disposed in axial alignment with the pole pieces of the other of said structures; an armature supported for rotation in said field comprising a pair of armature units each including said even number of armature pole pieces disposed in uniform circumferential spaced relation to each other with the armature pole pieces of one of said units circumferentially staggered relative to the armature pole pieces of the other of said units; a single circuit winding for said field connected to a source of electric power and so arranged as to induce a magnetic polarity in each of said poles opposite to the polarity induced in circumferentially adjacent field poles; a single circuit armature winding for each of said armature units, said armature windings being so arranged as to induce in each armature pole a magnetic polarity opposite to that induced in circumferentially adjacent armature poles upon the passage of an electric current through said armature windings; commutating means carried by said armature and connected between each of said armature windings and a source of electric power for first disconnecting said armature windings from said source of power and then re-connecting said windings for a reverse direction of current flow therethrough upon the movement of the armature poles associated with said armature winding past each of said field pole pieces of the corresponding field structure; condenser means connected in parallel with each of said armature windings; and a pair of condenser means interconnecting corresponding ends of both of said armature windings.

12. In a dynamo, a magnet pole construction comprising a laterally extending pole piece of substantially rectangular cross section, and a pole face integral with said pole piece defining a plurality of circumferentially extending pole teeth.

13. In a dynamo, a magnet pole construction comprising a laterally extending pole piece of substantially rectangular cross section, and a pole face integral with said pole piece defining a plurality of circumferentially extending pole teeth, said pole teeth being spaced from each other axially of said dynamo.

14. In a dynamo, a magnet pole construction comprising a laterally extending pole piece of substantially rectangular cross section, and a pole face integral with said pole piece defining a plurality of circumferentially extending pole teeth, said pole teeth being spaced from each other axially of said dynamo, the portions of said pole face disposed between said teeth having a peripheral width less than the width of said pole piece.

15. In a dynamo, the combination of: a stationary field comprising a plurality of radially inwardly extending field pole pieces disposed in uniform circumferential spaced relation to each other; a field pole face formed integrally with each of said field pole pieces defining a plurality of peripherally extending field pole teeth disposed in axial spaced relation to each other; an armature supported for rotation in said field comprising a number of armature pole pieces equal to the number of field pole pieces in said stationary field; and an armature pole face on each of said armature pole pieces defining a plurality of armature pole teeth disposed in axial spaced relation to each other in axial alignment with said field pole teeth, said armature pole teeth being extended in a peripheral direction opposite to the direction of extension of said field pole teeth.

16. In a dynamo construction, the combination of: an armature structure defining a plurality of armature poles and having a central shaft receiving bore formed therein, said armature having a plurality of keyways formed in the interior surface of said shaft receiving bore; and an armature supporting shaft received in said bore having a plurality of longitudinally extending keys formed integrally therewith and received in said keyways.

17. In a dynamo construction, the combination of: an armature structure defining a plurality of armature poles and having a central shaft receiving bore formed therein, said armature having a number of keyways formed in the interior surface of said shaft receiving bore; and a tubular armature supporting shaft received in said bore having a lesser number of longitudinally extending keys formed integrally therewith and received in a part of said keyways, said shaft also having longitudinally extending channels formed therein in positions aligned with those of said keyways not engaged by said keys and also having orifices extended through said shaft to provide communication between the interior of said shaft and said channels, whereby electrical conductors may be extended along said channels and through said orifices into the interior of said tubular shaft.

18. In a dynamo construction including a stationary field and a rotating armature having a commutated armature winding, the combination of: a hollow shaft for supporting said armature for rotation in said field; and condenser means disposed on the interior of said armature shaft and connected in parallel with said armature for eliminating sparking at the commutator of said dynamo.

19. In an armature construction for a dynamo, the combination of: a supporting shaft; an armature on said shaft comprising a plurality of armature stampings disposed in abutting contact with each other, each of said stampings having a notch formed therein and disposed in alignment with each other to define a longitudinally extending channel disposed between said armature and said shaft; and a binding strap disposed in said channel having protruding ends bent up along the outside of said armature to hold said stampings against axial movement relative to each other.

20. In a dynamo construction, the combination of: a dynamo frame including a pair of end bells; a ball bearing carried in one of said end bells; an armature shaft disposed on the interior of said frame and having one end extended through said bearing, said shaft being enlarged on the interior of said frame and having a longitudinally extending bore formed therein; a ball bearing received in the interior of said bore at the other end of said shaft; and a stub shaft carried by said other end bell and extended through said other ball bearing.

ALEX BERTEA.